_United States Patent_ [19]

Asami

[11] 4,367,791

[45] Jan. 11, 1983

[54] HEAT TRANSFER TUBING FOR NATURAL GAS EVAPORATOR

[75] Inventor: Takayoshi Asami, Otsu, Japan

[73] Assignee: Kobe Steel, Ltd., Kobe, Japan

[21] Appl. No.: 199,529

[22] Filed: Oct. 22, 1980

Related U.S. Application Data

[62] Division of Ser. No. 7,324, Jan. 29, 1979, Pat. No. 4,296,539.

[30] Foreign Application Priority Data

Jan. 27, 1978 [JP] Japan .................................. 53-8601

[51] Int. Cl.³ .......................... F28F 13/12; F28F 1/42; F28D 3/02
[52] U.S. Cl. .................................. 165/109 T; 62/52; 165/171; 165/179; 165/183
[58] Field of Search .................... 165/171, 109 T, 179, 165/183; 62/52

[56] References Cited

U.S. PATENT DOCUMENTS

| | | | |
|---|---|---|---|
| 2,960,114 | 11/1960 | Hinde | 165/179 |
| 3,636,982 | 1/1972 | Drake | 165/179 X |
| 3,871,407 | 3/1975 | Bykor et al. | 165/179 X |
| 4,031,602 | 6/1977 | Cunningham et al. | 165/179 X |
| 4,080,703 | 3/1978 | Beck, Jr. | 165/171 X |

FOREIGN PATENT DOCUMENTS

| | | | |
|---|---|---|---|
| 2903079 | 8/1979 | Fed. Rep. of Germany | 62/52 |
| 1021606 | 2/1953 | France | 165/183 |
| 1186583 | 1/1959 | France | 165/171 |
| 74384 | 11/1960 | France | 165/183 |
| 54-101539 | 8/1979 | Japan | 165/179 |
| 55-10165 | 1/1980 | Japan | 62/52 |

_Primary Examiner_—Sheldon J. Richter
_Attorney, Agent, or Firm_—Oblon, Fisher, Spivak, McClelland & Maier

[57] ABSTRACT

A heat transfer tube for a water-spray-panel evaporator for the gasification of liquefied natural gases which includes a tube having a pair of planar members each projecting outwardly from its peripheral surface, radially with respect to its longitudinal axis and extending longitudinally along such axis, and an internal fin disposed within the tube and having at least three fin members each projecting radially with respect to the longitudinal axis to provide a helical formation extending along and about the longitudinal axis, the helix of the helical formation contacting the internal wall of the tube in a pressure-fitting relationship. The heat transfer tubes can be assembled to form a panel evaporator. The method for fabricating such heat transfer tubes and assemblies is characterized in that the above pressure-fitting relationship is established by drawing the tube alone to reduce its internal diameter until the helix of the helicoid is abutted against the internal wall of the tube.

39 Claims, 11 Drawing Figures

HEAT TRANSFER TUBING FOR NATURAL GAS EVAPORATOR

This is a division of application Ser. No. 007,324, filed Jan. 29, 1979, now U.S. Pat. No. 4,296,539.

BACKGROUND OF THE INVENTION

1. Field of the Invention

This invention relates to improvements in heat transfer tubes and tube assemblies for a water-spray panel evaporator for the gasification of liquefied natural gases and a method for maufacturing such improved tubes and tube assemblies. More particularly, the invention relates to heat transfer tubes with improved heat transfer performances, assemblies of such tubes and a method for manufacturing such tubes and tube assemblies.

2. Description of the Prior Art

The liquefied gas evaporator of the water-spray type is an evaporator having a liquefied gas guided through the interior of heat-transfer tubing in an upward direction while a heating medium such as seawater or industrial water is sprinkled against the exterior of the heat transfer tubing, whereby the liquefied gas is heated across the heat transfer tubing and, hence, gasified. This type of evaporator has several features unshared by other gasification systems.

The pattern of heat exchange between materials having a very large temperature difference, for example between a liquefied natural gas and water, where the former has a temperature of, for example, $-150°$ to $-200°$ C. and the latter has a temperature of, for example, $5°$ to $20°$ C. is significantly different from the normal pattern of heat exchange and, even in the case of boiling heat transfer which is generally acknowledged to provide an excellent heat transfer performance, the film boiling that takes place under such circumstances causes a reduction in heat transfer performance, thus thwarting attempts to obtain a satisfactory heat transfer performance.

Figure 1:
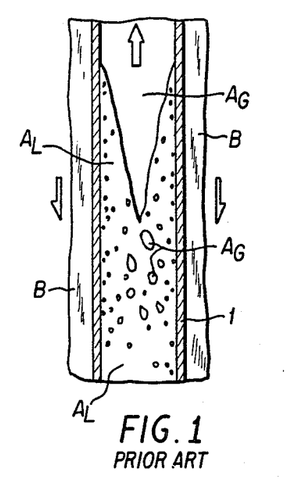
FIG. 1 is a schematic view illustrating an ordinary binary-flow heat transfer pattern.

By way of illustration, FIG. 1 is a schematic diagrammatic representation of the normal gas-liquid binary-flow heat transfer pattern providing a satisfactory heat transfer performance, obtained when a liquefied gas AL to be gasified is fed into the interior of a heat transfer tube 1 and water B as a heating medium is passed externally of the tube 1 to accomplish an exchange of heat therebetween. In the above arrangement, the liquefied gas AL in tubing 1 normally presents a vapor-liquid binary flow, with the gas AG produced by heat exchange progressively departing from the tube wall and ascending in the central zone of the tubing and the liquefied gas AL adjacent the gas-liquid boundary being drawn up to the tube wall in a sectional configuration approximating the letter V as illustrated in FIG. 1. Since, in this situation, there is adequate contact between the heat transfer tubing liquefied gas AL, a high heat transfer performance and, hence, a satisfactory evaporation effect are realized.

However, when the material to be evaporated is a material having a very low boiling point such as a liquefied natural gas, the binary flow situation depicted in FIG. 1 does not prevail because of the extremely large temperature difference between the evaporation load and the heating medium. Rather, a so-called film boiling takes place to cause a sharp reduction in heat transfer performance.

Figure 2:
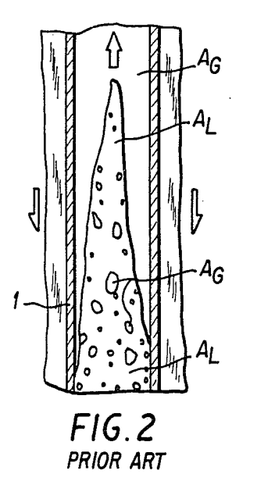
FIG. 2 is a schematic view illustrating a film-boiling heat transfer pattern.

This film-boiling heat transfer situation is schematically shown in FIG. 2, where the liquefied gas AL undergoes film-boiling at the tube wall and is quickly gasified with the liquefied gas AL being centrally distributed in the form of a cone within the tubing 1. Since the area of contact between liquefied gas AL and tubing 1 is too small to provide adequate heat transfer, the heat transfer performance is considerably affected. To overcome the above disadvantages, it has been proposed to insert a twist-tape into the heat transfer tube 1 to create a spiral upward flow of liquefied gas A and to thereby disrupt the liquid cone and cause the liquid mist particles to impinge on the tube wall. In this connection, it has also been proposed to increase the heat transfer area by providing the internal surface of the tube with dimples or fins. Nonetheless, as far as a water-spray type panel evaporator for liquefied natural gas is concerned, there is much to be desired with respect to efficiency and other performance parameters.

This invention has been accomplished under the circumstances briefly described above.

SUMMARY OF THE INVENTION

It is an object of this invention to provide a heat transfer tube which does not give rise to a liquid cone which is a major contributory factor in reduced heat transfer performance.

It is another object of this invention to provide a heat transfer tube having an extended effective heat transfer area to thereby enable a liquefied gas evaporator to display an exceptionally high heat transfer performance.

It is still another object to provide an assembly of such heat transfer tubes.

It is still another object to provide a method by which such heat transfer tubes and tube assemblies may be easily fabricated.

The above-mentioned objects are accomplished by the heat transfer tube and tube assembly of this invention and the method of manufacturing such tube and tube assembly which is also described herein. Thus, this invention is directed, in one aspect, to a heat transfer tube including a tubular body member having an opposed pair of planar members each projecting outwardly from its peripheral surface and radially with respect to its longitudinal axis and an internal helical fin element disposed within the tubular body member and having at least three fin members each projecting radially with respect to its longitudinal axis in a helical formation extending along and about the longitudinal axis thereof, the spiral of the helical formation being held in contact with the internal wall of the tubular member in pressure-fitting relationship. The use of such an internal fin element having at least three fin members dividing the passageway for liquefied natural gas into three or more helically extending channels provides a sufficient turbulence of flow which precludes formation of the liquid cone mentioned hereinbefore. Moreover, the pressure-fit between the helix of the helicoidal formation provided by those fin members and the internal surface of the tubular body member permits conduction of heat from the tubular body to the internal fin element and, hence, an effective utilization of both the internal wall of the tubular body member and the exterior surface of the internal fin element as effective heat transfer areas.

The formation of external fins, particularly a plurality of external fins having a substantially triangular cross-sectional configuration, on the tubular body or its planar members, or on both of the body and planar members, provides an extended exterior heat transfer area. Similarly, the provision of the internal fin members with surface undulations such as fins and flutes increases the heat transfer area of the internal fin element, thus resulting in a further enhancement of heat transfer performance. In another aspect, this invention is directed to a heat transfer tube assembly including a plurality of heat transfer tubes of the construction described hereinabove.

In a third aspect, this invention is directed to a method for fabricating the heat transfer tube or tube assembly described above. The method includes preparing an elongated tube having an opposed pair of planar members projecting outwardly from its peripheral surface and radially with respect to its longitudinal axis and extending longitudinally along the axis on the one hand and an elongated internal helical fin element having at least three fin members each projecting radially with respect to its longitudinal axis to provide a helicoidal formation extending along and about the longitudinal axis thereof on the other hand, inserting the internal element into the tube and drawing the tube alone in the direction of the longitudinal axis thereof to reduce its diameter and thereby forcing the spiral of the helical formation, which is the outer diameter of the internal fin element, against the internal wall of the tube to establish a pressure-fitting relation therebetween. To manufacture the heat transfer tube assembly, the method further includes the step of joining a plurality of such heat transfer tubes by welding, pressure-fitting or other means through the intermediary of the opposed planar members of each constituent heat transfer tube.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 3 through 7 are views showing the heat transfer tubing according to this invention, in which:

DETAILED DESCRIPTION OF THE PREFERRED EMBODIMENTS

Figure 3:
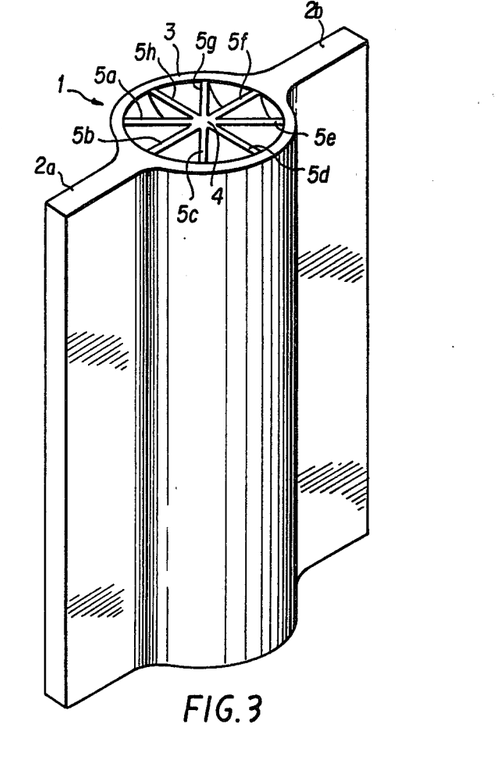
FIG. 3 is a partial perspective view thereof.

Referring to FIG. 3 which shows an embodiment of the heat-transfer tube of this invention, the tube 1 includes a tubular body 3 having an opposed pair of planar members 2a and 2b each projecting outwardly from its peripheral wall and radially with respect to its longitudinal axis and extending longitudinally along the axis and an internal fin element 4. The internal fin element 4, shown in FIGS. 3 and 4, includes at least three fin members (i.e. eight fin members as shown, 5a to 5h), the outer edges of these fin members 5a and 5h being held in pressure-fitting contact with the internal surface of the tubular body 3. While the heat transfer tube 1 includes only one tubular body in this particular embodiment, this invention is not limited to such a construction but, as shown in FIG. 5, may be an assembly of a plurality of heat transfer tubes (i.e. three tubes in FIG. 5) with the planar members 2 of the component tubes lying in a common plane and all the tubes being interconnected, as extruded, via the planar members 2 to present an integral unit.

Figures 4, 5, 6:
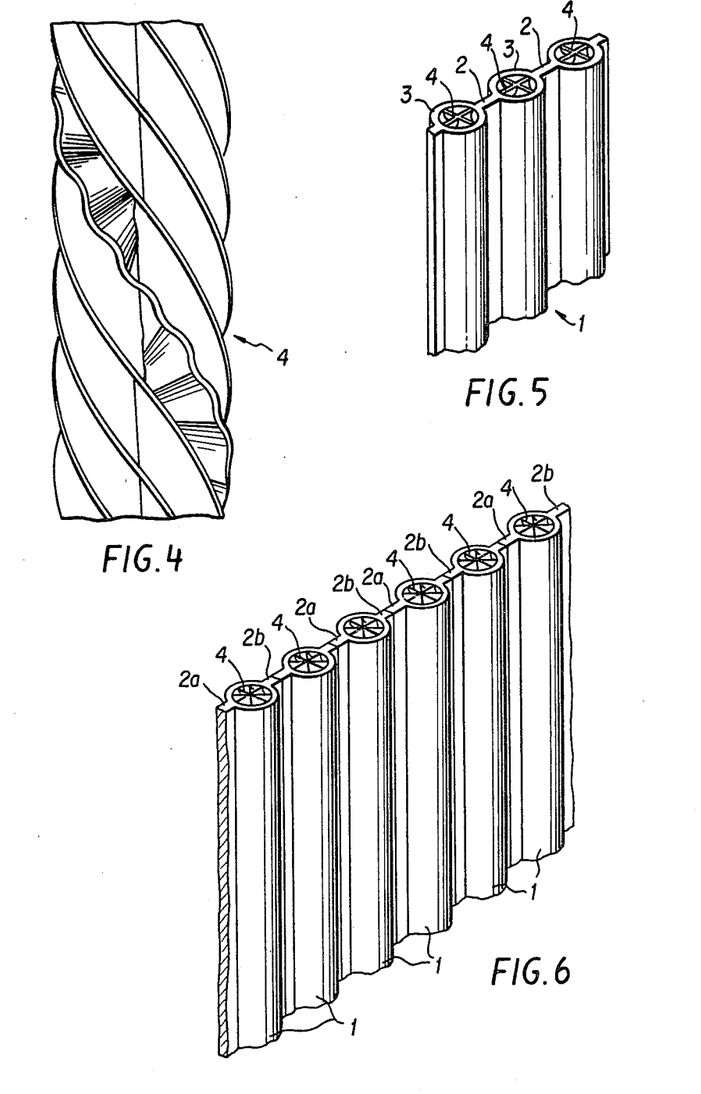
FIG. 4 is a partial side-elevation view illustrating an exemplary arrangement of internal helical fins thereof.
FIG. 5 is a partial perspective view similar to FIG. 3.
FIG. 6 is a partial perspective view illustrating an exemplary assembly of heat transfer tubes embodying the principles of this invention.

The choice between the structure illustrated in FIG. 3 and the structure illustrated in FIG. 5 is dictated solely by the relative ease or difficulty of fabrication, there being no substantial difference between the two structures in the performance of heat transfer tubing. Thus, as will be fully described hereinafter, it is reasonable to manufacture the tubular body 3 by extrusion of an aluminum alloy and since the extrusion-molding of the so-called multi-hollow product necessarily is more or less difficult, this criterion alone prevails in the choice between a multi-hollow structure and a single-hollow structure. Such choices as this fall within the scope of modification that can be easily made by one skilled in the art without departing from the spirit of this invention particularly pointed out in the claims appended hereto. Also, any such multi-hollow product consisting of a plurality of tubes thus formed by the extrusion-forming technology should be considered to be a form of the heat-transfer tube assembly according to this invention. In using such tubes or tube assemblies in actual evaporator applications, a plurality of the same are interconnected in such a manner that their planar members 2a and 2b will be lying in a common plane and the lateral edges of the adjacent planar members 2a and 2b will be adjoining in juxtaposed and parallel relationship (FIG. 6). Most desirably the tubular bodies 3, planar members 2a and 2b and internal fin element 4 constituting the heat-transfer tube 1 are made of an aluminum alloy having a high thermal conductivity. The assembly including a plurality of heat transfer tubes 1 constitutes a panel evaporator unit. Thus, water or seawater as the heating medium is sprayed against the exterior surface of the assemblage while the liquefied natural gas to be evaporated or gasified is fed from below so that the liquefied gas will be gasified by an exchange of heat with the heating medium as it flows upwardly.

As will be seen from FIG. 4, the internal fin element 4 fitted into each tubular body 3 provides helical channels for liquefied natural gas. In this arrangement, the upward liquid flow of liquefied natural gas is a turbulent flow as created by the helical configuration of internal fin element 4.

This arrangement precludes formation of a liquid cone like the one illustrated in FIG. 2 and the consequent reduction in heat transfer effect. Moreover, the liquid streams guided by the internal fin members are constantly forced against the internal surface of the tubular body 3 as they rise up the tube. Thus, the heat-transfer tube according to the present invention displays an unsurpassed heat-transfer effect as a cumulative or synergistic result of these features.

Furthermore, because in this invention the helices or outer edges of fin members 5a and 5h constituting the internal fin element 4 are held in pressure-fitting relation with the internal wall of the tubular body 3, the heat from the outer wall of the tube is not only transferred to the internal wall of the tubular body 3 by conduction but also to the internal fin element 4 through the helices of the fin members. Since the effective heat transfer area of the heat transfer tube is accordingly the sum total of the surface area of the internal wall of the tubular body 3 and the combined surface area of the face and reverse sides of the fin members 5a through 5h, a considerable gain in heat transfer performance is obtained.

The art of agitating a liquefied natural gas flow by the insertion of a single helical fin into a tubular element has been described and it appears that even such art offers fair improvements over the earlier technology. However, because such a heat transfer tube incorporates only a single helical fin, it is still inadequate in producing a turbulent flow of liquefied gas. Moreover, because the helical fin is merely inserted into the tube and, hence, a small clearance is left between the internal wall of the tube and the helicoidal fin, the heat from the external surface of the tube is merely conducted to its internal surface and is not conducted to the helical fin. Since the effective heat transfer area is thus limited to the internal surface of the tube, agitation of the liquefied gas flow results only in a limited increase in heat-transfer performance. In this connection, it has also been proposed and practiced to increase the effective heat transfer area by dimpling the internal wall of the tubular body but this amount of modification does not lead to any marked improvement in heat transfer performance. Furthermore, if the internal wall is dimpled, the gas bubbles will tend to accumulate in the areas and could rather cause a drop in heat transfer effect.

The foregoing is in sharp contrast with the results accomplished by this invention. Thus, in accordance with this invention, the liquefied gas flow is sufficiently agitated by the internal fin element 4 and, because the outer edge of the internal fin element 4 is held in pressure-fitting contact with the internal wall of the tubular body 3, both the face and reverse sides of the fin members 5a through 5h function as effective heat transfer areas to markedly increase the heat transfer performance of the tubing. This is the most outstanding feature of this invention.

The internal fin element 4 of the heat transfer tube according to this invention includes at least 3 fin members as mentioned hereinbefore and the number of such fin members is not particularly critical only if it is not less than 3.

However, in consideration of the agitation of the liquefied natural gas, pressure drops and the ease of manufacture, it is desirable that the internal fin element be provided with 6 to 10 fin members, or most desirably, 8 fin members. When the number of fin members is less than 3, no adequate agitation is obtained and, hence, no effective binary flow heat transfer takes place. When the number of fin members is in excess of 10, the element is difficult to manufacture and the increased flow resistance causes a significant pressure drop.

The thickness of the internal fin members is desirably within the range of 1.0 to 1.5 mm. If the fin members are too thin, the area of contact with the internal surface of the tubular body is too small to ensure an adequate transfer of heat from the internal fin element to the exterior of the tubing and the physical strength of the fin element is also inadequate. If the internal fin members are too thick, the cross-sectional area of the liquefied gas channels is decreased and, hence, the flow resistance is increased. Moreover, because an evaporator tubing of this type of liquefied natural gases is at times subject to pressures as high as 100 kg/cm$^2$, the factor of pressure resistance is an important design consideration. The heat balance between the sectional area of the flow and the available surface area must also be taken into consideration. While, as mentioned hereinbefore, the heat transfer is generally best fabricated by extrusion of aluminum alloy, the factors involved in the manufacturing process must further be taken into consideration. These considerations dictate that the internal diameter of the tube should be somewhere between about 10 to a little more than 20 centimeters.

In view of the above requirements, the internal fin element according to this invention is subject to fairly severe design conditions. Thus, the internal fin element must be of such shape and size that:
(1) it lends itself well to the aluminum alloy extrusion process,
(2) adequate contact is assured between the fin element and the tubular body,
(3) the fin members are not liable to be damaged and
(4) the basic requirement of a heat-exchanger, i.e. a balance between flow resistance and pressure drop, is satisfied.

Aside from the above requirements, the relation between the outer diameter of the internal helical fin element and the lead of its helix also has substantial influences on agitation effect and flow resistance but our experiments have shown that, with the outer diameter of the internal fin element and the lead or pitch of its helix being represented by D and L, respectively, the most satisfactory results are obtained when L/D is somewhere between 5 and 15, particularly within the range of 9 to 10. If L/D is too small, flow resistance will be excessive and the internal element will be difficult to fabricate. If L/D is too large, the agitation effect will be insufficient and it will become difficult to ensure the proper binary-flow heat transfer pattern.

As will be understood from the above description, one of the most outstanding characteristics of this invention is that the effective heat transfer area has been increased by having the internal fin element abutted forcefully against the internal surface of the tubular body. Of course, to obtain a still marked increase in the effective heat transfer area of the internal fin element, it is desirable that the face and reverse sides of each of the fin elements be fluted or otherwise formed with alternating raised and depressed areas. However, since such formations on the internal surface of the tubular body will result in a decreased heat transfer effect due to the local accumulation of bubbles of vaporized liquid, the internal surface of the tubular body should not be fluted or dimpled.

Figure 7:
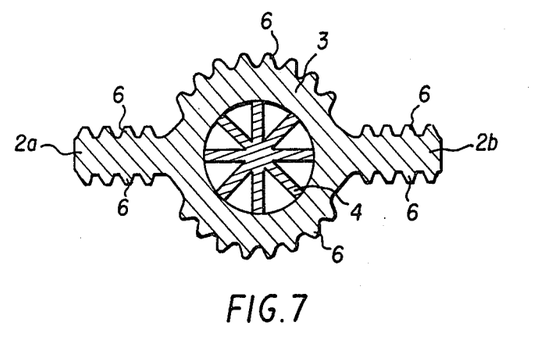
FIG. 7 is a cross-sectional elevation view showing a preferred embodiment of the heat transfer tube according to this invention.

Referring to the tubular body 3 which is the principal member of the heat transfer tube 1, while it may be of any optional configuration or structure only if it is provided with an opposed pair of planar members projecting radially and externally from its exterior surface, a still improved heat transfer performance can be realized by adopting the following construction. Thus, referring to FIG. 7 which illustrates a heat transfer tube 1 including the most preferred tubular body 3 in accordance with this invention, the planar members 2a and 2b as well as the tubular body 3 are provided with a multiplicity of external flutes 6 running in parallel with the longitudinal axis of the tube to provide an extended external effective heat transfer area. Thus, in this particular embodiment, the utilization of the face and reverse sides of fin members constituting the internal fin element 4 provide effective heat transfer areas and the provision of external flutes 6 on the exterior surfaces of tubular body 3 and planar members 2a, 2b for additional effective heat transfer areas, taken together, result in an outstanding heat transfer performance. In the heat transfer tube of this invention, the internal surface of the tubular body is held in pressure-fitting contact with the internal fin element, whereby the internal allowable heat flux is improved over that of the prior art heat transfer tube. In this arrangement and under the conditions contemplated by the invention, i.e. the particular load and medium (liquefied gas and water) and the dimensions of the tubular body which have been specified hereinbefore, it is preferable to provide the tube with the external fins for the purpose of striking a balance between the internal and external allowable heat flux. This arrangement is desirable also for the prevention of freezing which is the most important consideration in the design of this type of evaporator. Thus, with use of the internal fin element according to this invention, the internal allowable heat flux between the tube and its interior is considerably higher than that of the conventional equipment and, if the external allowable heat flux is low under such conditions, the temperature of the external surface of the tube is far lower than the temperature of water, with the result that the external water tends to be frozen. However, the provision of the external fins helps achieve an improvement in external allowable heat flux thus arresting the tendency toward freezing.

Because, as aforesaid, the external fins 6 are provided to increase the external effective heat transfer area, the configuration and number of such fins are not particularly critical. However, in consideration of the formability of fins 6 and the heat transfer performance that may be achieved, it is most desirable that each fin be substantially triangular in cross-section, preferably equilateral-triangular, with the free apex thereof being rounded. It should be understood that the term "substantially triangular" or "substantially equilateral-triangular" does not only mean the shape of a "triangle" as a geometrical term but includes such other shapes as, for example, a sinusoidal curve as drawn around the circumference of a circle. Thus, any configuration having a broadened base is subsumed in the category of substantially triangular shapes in the context of this invention. The tubular body 3 is most generally formed by extrusion of aluminum alloy together with a pair of planar members 2a and 2b as a single integral unit and when external fins 6 are substantially triangular as in this invention, the desired product can be easily obtained by the extrusion technique using an external die provided with grooves configured to be substantially triangular. Moreover, in heat-transfer service, if external fins on the external surfaces of the tubular body 3 and/or planar members 2a and 2b are formed with narrow and deep flutes, it would be impossible to secure a uniform film of water on spraying and foreign matter would collect in the flutes to rather reduce the effective heat transfer area and render the cleaning of the tube difficult.

The provision for substantially triangular external fins and particularly those with rounded apexes are described hereinbefore does not cause the aforementioned difficulties and allows the extended effective heat transfer area to be fully utilized. Thus, in the general heat transfer tube, the aspect of direction of fins being set aside, the cross-sectional shape of fins is usually planar in order that the density of fins may be increased as much as possible. In the natural gas evaporator contemplated by this invention, the use of such design parameters would cause considerable difficulties. Thus, in this type of evaporator, freezing on the external surface should result in a drastic decrease in efficiency. This problem of freezing is generally acknowledged to be one of the most important design considerations. This mechanism of freezing as observed under operating conditions is such that when an irregular temperature distribution is obtained over the external surface of the tube, freezing in certain localized areas grow and spread. If the aforementioned conventional design procedure be applied to such a situation, freezing starts almost immediately to cause a drastic reduction in heat transfer performance. In contrast, according to the design principles of this invention, heat transfer loads in various parts of the external surface are rendered uniform and this result, coupled with the aforementioned formation of a uniform water film and other features, successfully reduces the tendency toward freezing.

The number of external flutes 6 is also subject to a certain maximum limit insofar as the prevention of freezing, the formation of a water film and the deposit of foreign matter and scale are taken into consideration. Within the abovementioned dimensional limits for the tube, the most desirable result is obtained when the external surface of the tubular body proper 3 is provided with 10 to 20 fins. If the number of fins is still larger, the flutes formed thereby will naturally be narrowed and be conductive to the formation of a water film or the deposit of dirt and scale. If the number of external fins 6 is too small, no sufficient extention to the effective heat transfer area will be obtained.

When both the tubular body proper and the planar or fins are provided with flutes, the root or base portion of each planar member 2a or 2b which is contiguous with the body proper should be left plain, i.e. without flutes, for even in the absence of flutes, the area is already curved and the provision of a fin in the particular area will make still narrower flutes.

As mentioned hereinbefore, the tubular body proper 3, planar members 2a, 2b and internal fin element 6 are most advantageously made of aluminum alloy but other metals and alloys may of course be employed in lieu of aluminum alloy insofar as such metals or alloys have high thermal conductivities.

The method for fabricating the heat transfer tube 1 according to this invention will hereinafter be described. Because the tubular body 3 having the opposed pair of planar members 2a, 2b is rectilinear, it can be easily manufactured by the conventional extrusion method. To manufacture the internal fin element 6, the provision of the extruder with a die having appropriate configuration, size and grooves permits production of the element 6 in a single extrusion cycle. It is also possible to employ a multi-hollow extrusion method, in which case a plurality of several tubular bodies may be manufactured in a single extrusion cycle.

Figure 8:
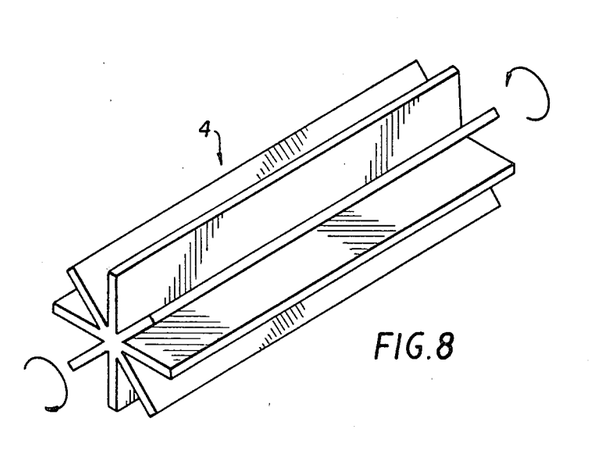
FIG. 8 is a perspective view showing a method for preparing a helical internal fin element.

Regarding the internal fin element 4, on the other hand, because it includes a helical formation of fin members, some ingenuity is required in the forming of the internal fin element. The numerous manufacturing trials by us have shown that it is the most practical to follow the steps of preparing an internal element 4 having rectilinear fin members by way of extrusion as illustrated in FIG. 8 and, then, subjecting the element to an external torsional force to obtain the desired internal fin element having a helical formation. Among other alternative methods are the method involving a torsional take-up of the extrudate and the method involving the use of a rotating extrusion die, to name but a few. These latter processes are herein referred to generally as torsional extrusion. The tubular body 3 having planar members (and external fins) and the internal fin element 4, both prepared as above, are then assembled together into the heat transfer tube 1.

Figures 9, 10, 11:
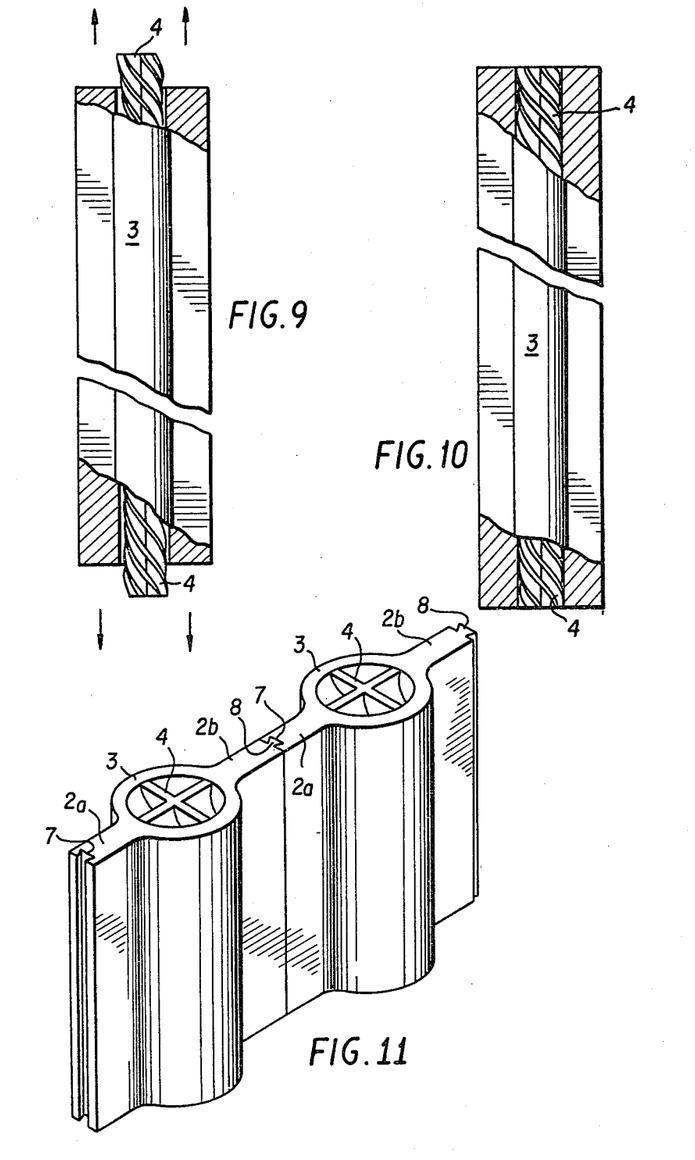
FIGS. 9 and 10 are schematic sectional diagrammatic views illustrating the procedure for accomplishing a pressure-fitting of the internal fin element with the tubular body.
FIG. 11 is a perspective view of pertinent members, illustrating an exemplary combination of heat transfer tubes.

In this connection, it would be difficult to obtain a tight pressure-fit between the outer edge of the internal fin element 4 and the internal surface of the tubular body 3 by a mere insertion of the element 4 into the tubular body 3. Such a pressure-fit between the two members is neatly and easily established by the method of this invention. Thus, for example, the desired pressure-fit can be easily established by the procedures schematically illustrated in FIGS. 9 and 10. First, a tubular body 3 having planar members (optionally, plus external fins) and a helical internal fin element 4 having an outer diameter slightly less than the inner diameter of the tubular body 3 are prepared and, after the internal fin element 4 is inserted into the tube body 3 (FIG. 9), the tube body 3 alone is drawn in the direction of its longitudinal axis. Since this drawing reduces the inner diameter of the tubular body 3, the internal wall of the body is pressure-fitted with the outer edge of the internal fin element 4 (FIG. 10). This is a very simple operation. In contrast, it would be quite difficult to insert an internal fin element into a tube body having an inner diameter substantially equal to the outer diameter of the internal fin element and it is almost impossible to adopt such a procedure in the production of extra-length heat transfer tubes. Therefore, in the prior art technology an internal fin element is fitted into a tubular body having an inner diameter slightly larger than the outer diameter of the former. However, such a known technique leaves a clearance between the outer edge of the internal fin element and the inner surface of the tubular body, thus interferring with an effective transfer of heat and being unable to accomplish the results contemplated by this invention.

As will be understood from the above description, the internal fin element is subject to a compressive stress (axial) of a significant magnitude and, if only to ensure an adequate resistance to the stress, the number and thickness of the fin members should be as specified hereinbefore.

A plurality of such heat transfer tubes are then assembled into a panel heat exchanger. The assembly thereof is most simply accomplished as follows. Thus, such a plurality of heat transfer tubes are arranged so that the planar members 2a and 2b of component tubes will be lying in a common place and each adjoining couple of planar members 2a and 2b are then welded together. As an alternative, the free end faces of the planar members 2b and 2a are previously provided with a projection 7 and a groove 8, which taken together form a dovetail joint, and the tubes are assembled into an integral panel by mating the projection 7 with the groove 8. A still further alternative procedure may comprise providing the planar members 2a and 2b with complementary stepped portions and securing these stepped portions to each other by means of suitable fastener members such as bolts and nuts, with or without interposed coupling members.

Among the numerous advantageous results accomplished by this invention, the following may be particularly mentioned.

(1) Because of the tight pressure-fit between the outer edge of the internal fin element and the internal surface of the tubular body, the free surface areas of the internal fin members are also effectively utilized as heat transfer areas and the resultant increased allowable heat flux area leads to a marked improvement in heat transfer preformance.

(2) The tight pressure-fit between the outer edge of the internal fin element and the internal wall of the tubular body can be easily established and the product heat transfer tube is substantially free from defects such as inadequate heat transfer due to insufficient contact and the abnormal deformation of the internal fin element.

(3) Because the internal fin element includes at least three fin members, the heat transfer tube according to this invention ensures an effective agitation of liquefied natural gas, thus providing a positive binary-phase heat transfer state.

(4) The provision of a plurality of external fins over the exterior surface of the tubular body as well as over the planar members projecting out of the periphery of the tubular body results in an increased effective heat transfer area on the external side of the tubing as well. This increased exterior effective heat transfer area plus the increased internal heat transfer area mentioned hereinbefore results in a marked improvement in heat transfer performance.

(5) The substantially triangular, particularly substantially equilateral-triangular, cross-sectional configuration of the external fins makes for an outstanding heat transfer performance which is sustainable for several hours without losses due to freezing on the exterior surface of the heat transfer tubing.

The principles of this invention have been described herein in sufficient detail to enable others to clearly understand the invention upon a reading of the disclosure. As many possible embodiments of this invention may be made and as many possible changes may be made in the embodiments herein described, it is to be distinctly understood that the foregoing description is to be interpreted merely as illustrative of this invention and not as a limitation.

What is claimed as new and desired to be secured by Letters Patent of the United States is:

1. A heat transfer tube assembly including extrudates of aluminum for a water spray-panel type evaporator for the gasification of liquified natural gases comprising:
a plurality of heat transfer tubes each comprising a tubular body, an opposite pair of planar members each projecting outwardly from the peripheral surface of said tubular body and radially with respect to the longitudinal axis of said tubular body and extending longitudinally along said axis, said planar members and said tubular body being provided with a plurality of external fins extending in parallel with said longitudinal axis, and a helical fin element including extrudates of aluminum and having a helical lead L and an outer diameter D, said helical fin element disposed within said tubular body and including at least three fin members each having a thickness in the range of 1.0 to 1.5 millimeters and each projecting radially outwardly with respect to said longitudinal axis to provide a helical formation extending along and about said longitudinal axis such that each said helical fin element comprises a ratio of L/D in the range of 9 to 10, the helix of said helical formation contacting the internal surface of said tubular body in a pressure-fitting relationship; and said plurality of heat transfer tubes being interconnected in a row with said planar members lying in a common plane and adjoining planar members being secured to each other in a parallel and juxtaposed relationship.

2. A heat transfer tube assembly according to claim 1 wherein said fin members of each of said helical fin elements comprise 6 to 10 fin members.

3. A heat transfer tube assembly according to claim 2 wherein said fin members comprise 8 fin members.

4. A heat transfer tube assembly according to claim 1 or 3 wherein said fin members of said helical fin element have a plurality of longitudinally extending surface undulations.

5. A heat transfer tube assembly according to claim 1, or 3 wherein said external fins projecting from each of said tubular bodies comprise 10 to 20 external fins.

6. A heat transfer tube including extrudates of aluminum for a water-spray-panel evaporator for the gasification of liquified natural gases comprising:
a tubular body,
an opposed pair of planar members each projecting outwardly from the peripheral surface of said tubular body and radially with respect to the longitudinal axis of said tubular body and extending longitudinally along said axis, said planar members and said tubular body including a plurality of external fins extending in parallel with said longitudinal axis and having a substantially equilateral triangular sectional configuration; and
a helical fin element including extrudates of aluminum and having a helical lead L and an outer diameter D, said helical fin element disposed within said tubular body and having at least three fin members each having a thickness in the range of 1.0 to 1.5 millimeters and each projecting mradially with respect to said longitudinal axis to provide a helical formation extending along and about said longitudinal axis such that said helical fin element comprises a ratio of L/D in the range of 9 to 10, the helix of said helical formation contacting the internal surface of said tubular member in a pressure-fitting relationship.

7. A heat transfer tube according to claim 6 wherein said fin members of said helical fin element comprise 6 to 10 fin members.

8. A heat transfer tube according to claim 7 wherein said fin members comprise 8 fin members.

9. A heat transfer tube according to claim 6, or 8 wherein said fin members of said helical fin element are respectively provided with a plurality of longitudinally extending surface undulations.

10. A heat transfer tube according to claim 6, 7 or 8 wherein said external fins projecting externally from said tubular body comprise 10 to 20 external fins.

11. A heat transfer tube according to claim 6, 7 or 8 wherein said external fins each has a substantially equilateral-triangular sectional configuration.

12. A heat transfer tube assembly including extrudates of aluminum for a water-spray-type panel evaporator for the gasification of liquified natural gases including a plurality of heat transfer tubes each comprising:
a tubular body,
an opposed pair of planar members projecting outwardly from the peripheral surface of said tubular body and radially with respect to the longitudinal axis of said tubular body and extending longitudinally along said axis, said planar members and tubular body proper including a plurality of external fins extending in parallel with said longitudinal axis and having a substantially triangular sectional configuration, and
a helical fin element including extrudates of aluminum and having a helical lead L and an outer diameter D, said helical fin element disposed within said tubular body and having at least three fin members each having a thickness in the range of 1.0 to 1.5 millimeters and each of said at least three fin members projecting radially outwardly with respect to said axis to provide a helical formation extending along and about said axis such that each said helical fin element comprises a ratio of L/D in the range of 9 to 10, the helix of said helical formation contacting the internal surface of said tubular body in a pressure-fitting relationship,
said plurality of heat transfer tubes being interconnected in a row with said planar members lying in a common plane and adjoining planar members being secured to each other in a parallel and juxtaposed relationship.

13. A heat transfer tube assembly according to claim 12 wherein said fin members of said helical fin element comprises 6 to 10 fin members.

14. A heat transfer tube assembly according to claim 13 wherein said fin members comprise 8 fin members.

15. A heat transfer tube assembly according to claim 12, 13 or 14 wherein said fin members of said helical fin element are each provided with a plurality of longitudinally extending surface undulations.

16. A heat transfer tube assembly according to claim 12, 13 or 14 wherein said plurality of external fins projecting out of said tubular body proper comprise 10 to 20 external fins.

17. A heat transfer tube assembly according to claim 12, 13 or 14 wherein each of said external fins has a substantially equilateral-triangular sectional configuration.

18. A heat transfer tube including extrudates of aluminum for a water-spray-type panel evaporator for the gasification of liquified natural gases comprising:
a tubular body,
an opposed pair of planar members projecting outwardly from the peripheral surface of said tubular body and radially with respect to the longitudinal axis of said tubular body and extending longitudinally along said axis, said planar members and said tubular body proper being provided with a plurality of external fins extending in parallel with said longitudinal axis, to the exclusion of a base portion of each of said planar members, and a helical fin element including extrudates of aluminum and having a helical lead L and an outer diameter D, said helical fin element disposed within said tubular body, and having at least three fin members each having a thickness in the range of 1.0 to 1.5 millimeters and each of said at least three fin members projecting radially outwardly with respect to said longitudinal axis to provide a helical formation extending along and about said longitudinal axis such that said helical fin element comprises a ratio of L/D in the range of 9 to 10, the helix of said helical formation contacting the internal surface of said tubular body in a pressure-fitting relationship.

19. A heat transfer tube according to claim 18 wherein said fin members of said helical fin element comprise 6 to 10 fin members.

20. A heat transfer tube according to claim 19 wherein said fin members comprise 8 fin members.

21. A heat transfer tube according to claim 18, 19 or 20 wherein said fin members of said helical fin element are respectively provided with a plurality of longitudinally extending surface undulations.

22. A heat transfer tube according to claim 18, 19 or 20 wherein said external fins projecting out of said tubular body proper comprise 10 to 20 external fins.

23. A heat transfer tube assembly including extrudates of aluminum for a water-spray-type panel evaporator for the gasification of liquified natural gases including a plurality of heat transfer tubes each comprising:
a tubular body,
an opposed pair of planar members each projecting outwardly from the peripheral surface of said tubular body and radially with respect to the longitudinal axis of said tubular body and extending longitudinally along said axis, said tubular body and said planar members including a plurality of external fins extending in parallel with said longitudinal axis except on a base portion of each of said planar members; and
a helical fin element including extrudates of aluminum and having a helical lead L and an outer diameter D, said helical fin element disposed within said tubular body and having at least three fin members each having a thickness in the range of 1.0 to 1.5 millimeters and each of said at least three fin members projecting radially outwardly with respect to said longitudinal axis to provide a helical formation extending along and about said axis such that said helical fin element comprises a ratio of L/D in the range of 9 to 10, the helix of said helical formation contacting the internal surface of said tubular body in a pressure fitting relationship.

24. A heat transfer tube assembly according to claim 23 wherein said fin members of each of said helical fin elements comprise 6 to 10 fin members.

25. A heat transfer tube assembly according to claim 24 wherein said fin members comprise 8 fin members.

26. A heat transfer tube assembly according to claim 23, 24 or 25 wherein said fin members of said helical fin element are each provided with a plurality of longitudinally extending surface undulations.

27. A heat transfer tube assembly according to claim 23, 24 or 25 wherein said external fins comprise 10 to 20 external fins.

28. A heat transfer tube including extrudates of aluminum for a water-spray-type panel evaporator for the gasification of liquified natural gases comprises:
a tubular body,
an opposed pair of planar members projecting outwardly from the peripheral surface of said tubular body and radially with respect to the longitudinal axis of said tubular body and extending longitudinally along said axis, said planar members and said tubular body proper being provided with a plurality of external fins extending in parallel with said longitudinal axis and having a substantially triangular-sectional configuration excluding a base portion of each of said planar members, and
a helical fin element including extrudates of aluminum and having a helical lead L and an outer diameter D, said helical fin element disposed within said tubular body and having at least three fin members each having a thickness in the range of 1.0 to 1.5 millimeters and each of said at least three fin members projecting radially outwardly with respect to said longitudinal axis to provide a helical formation extending along and about said axis such that said helical fin element comprises a ratio of L/D in the range of 9 to 10, the helix of said helical formation contacting the internal surface of said tubular body in a pressure-fitting relationship.

29. A heat transfer tube according to claim 28 wherein said fin members of said helical fin element comprise 6 to 10 fin members.

30. A heat transfer tube according to claim 29 wherein said fin members comprise 8 fin members.

31. A heat transfer tube according to claim 28, 29 or 30 wherein said fin members of said helical fin element are respectively provided with a plurality of longitudinally extending surface undulations.

32. A heat transfer tube according to claim 28, 29 or 30 wherein said external fins comprise 10 to 20 external fins.

33. A heat transfer tube according to claim 28, 29 or 30 wherein each of said external fins has a substantially equilateral triangular sectional configuration.

34. A heat transfer tube assembly including extrudates of aluminum for a water-spray-type panel evaporator for the gasification of liquified natural gases including a plurality of heat transfer tubes each comprising:
a tubular body;
an opposed pair of planar members projecting outwardly from the peripheral surface of said tubular body and radially with respect to the longitudinal axis of said tubular body and extending longitudinally along said axis, said planar members and said tubular body proper including a plurality of external fins extending in parallel with said longitudinal axis and having a substantially triangular sectional configuration excluding a base portion of each of said planar members; and
a helical fin element including extrudates of aluminum and having a helical lead L and an outer diameter D, said helical fin element disposed within said tubular body and having at least three fin members each having a thickness in the range of 1.0 to 1.5 millimeters and each of said at least three fin members projecting radially outwardly with respect to said longitudinal axis to provide a helical formation extending about and along said longitudinal axis such that each said helical fin element comprises a ratio of L/D in the range of 9 to 10, the helix of said helical formation contacting the internal surface of said tubular body in a pressure fitting relationship, said plurality of heat transfer tubes being interconnected in a row with said planar members lying in a common plane and said planar members being secured to each other in parallel and juxtaposed relationship.

35. A heat transfer tube assembly according to claim 34 wherein said fin members of said internal fin element comprise 6 to 10 fin members.

36. A heat transfer tube assembly according to claim 35 wherein said internal fin members comprises 8 fin members.

37. A heat transfer tube assembly according to claim 34, 35 or 36 wherein said fin members of said helical fin element are respectively provided with a plurality of longitudinally extending surface undulations.

38. A heat transfer tube assembly according to claim 34, 35 or 36 wherein said external fins comprise 10 to 20 external fins.

39. A heat transfer tube assembly according to claim 34, 35 or 36 wherein each of said external fins has a substantially equilateral triangular sectional configuration.

* * * * *

UNITED STATES PATENT AND TRADEMARK OFFICE
CERTIFICATE OF CORRECTION

PATENT NO. : 4,367,791

DATED : January 11, 1983

INVENTOR(S) : TAKAYOSHI ASAMI

It is certified that error appears in the above-identified patent and that said Letters Patent is hereby corrected as shown below:

In column 8, line 5, delete "are" after "apexes" and insert therefor --as--;

In column 11, line 51, delete "mradially" and insert therefor --radially--;

In column 13, line 67, delete "comprises" and insert therefor --comprising--.

Signed and Sealed this

Seventh Day of June 1983

[SEAL]

Attest:

DONALD J. QUIGG

Attesting Officer

Acting Commissioner of Patents and Trademarks